(12) United States Patent
Noel

(10) Patent No.: US 8,985,964 B2
(45) Date of Patent: Mar. 24, 2015

(54) MULTIPLE SWITCH FLOAT SWITCH APPARATUS

(76) Inventor: Raymond Ascord Noel, Thornbury (CA)

( * ) Notice: Subject to any disclaimer, the term of this patent is extended or adjusted under 35 U.S.C. 154(b) by 0 days.

(21) Appl. No.: 13/579,386

(22) PCT Filed: Feb. 17, 2011

(86) PCT No.: PCT/CA2011/000178
§ 371 (c)(1), (2), (4) Date: Aug. 16, 2012

(87) PCT Pub. No.: WO2011/100825
PCT Pub. Date: Aug. 25, 2011

(65) Prior Publication Data
US 2012/0312397 A1  Dec. 13, 2012

Related U.S. Application Data

(63) Continuation-in-part of application No. 12/707,971, filed on Feb. 18, 2010, now Pat. No. 8,430,641.

(51) Int. Cl.
*F04B 49/00* (2006.01)
*F04B 49/025* (2006.01)
(Continued)

(52) U.S. Cl.
CPC .............. *F04B 49/025* (2013.01); *G01F 23/60* (2013.01); *H01H 35/18* (2013.01)
USPC ............ 417/41; 417/40; 417/2; 417/3; 417/7; 200/84 R; 200/84 B; 200/84 C; 73/307; 73/308; 73/319; 116/110; 116/228

(58) Field of Classification Search
USPC ..... 417/2, 3, 7, 40, 41; 200/84 R, 84 B, 84 C; 73/307, 308, 319; 116/110, 228
See application file for complete search history.

(56) References Cited

U.S. PATENT DOCUMENTS 1,695,846 A * 12/1928 Harding ...................... 200/84 R
2,106,204 A *  1/1938 Burnell et al. ............. 250/208.4
(Continued)

OTHER PUBLICATIONS

Basement Watchdog Manual, Published 2009.*

*Primary Examiner* — Devon Kramer
*Assistant Examiner* — Thomas Fink

(57) ABSTRACT

A float switch apparatus for controlling the energization of multiple electric circuits in response to the level of a liquid in a vessel, and a pump system incorporating same, are provided. The apparatus has a guide structure adapted to be mounted in a fixed position relative to the vessel. A first micro-switch with a normal and an engaged position is mounted to the guide structure and is adapted to be connected into a first electric circuit to control the energization thereof. A second microswitch with a normal and an engaged position is mounted to the guide structure at a location above the first micro-switch and is adapted to be connected into a second electric circuit to control the energization thereof. A float rod is slideably mounted to the guide structure for reciprocating movement in a generally vertical direction in a zone above a resting position. The float rod has upper and lower float stops and a lower cam surface for releasing the first micro-switch from an engaged position to its normal position during upward movement of the float rod above the resting position. The float rod also has an upper cam surface for moving the second micro-switch from its normal position to its engaged position during upward movement of the float rod. The float, adapted to float with the level of liquid in the vessel, is slideably mounted to the float rod between the upper and lower float stops.

16 Claims, 11 Drawing Sheets

(51) Int. Cl.
  *G01F 23/60* (2006.01)
  *H01H 35/18* (2006.01)

(56) References Cited

U.S. PATENT DOCUMENTS

| | | | |
|---|---|---|---|
| 2,820,865 A * | 1/1958 | McKinnies | 200/84 R |
| 3,167,694 A * | 1/1965 | Bekedam | 335/206 |
| 3,270,158 A * | 8/1966 | Puster | 200/84 C |
| 3,932,853 A | 1/1976 | Cannon | |
| 4,064,755 A | 12/1977 | Bongort et al. | |
| 4,086,457 A | 4/1978 | Niedermeyer | |
| 4,186,419 A | 1/1980 | Sims | |
| 4,187,503 A | 2/1980 | Walton | |
| 4,255,747 A | 3/1981 | Bunia | |
| 4,456,432 A | 6/1984 | Mannino | |
| 4,647,740 A * | 3/1987 | Hansen et al. | 200/84 C |
| 4,755,640 A | 7/1988 | Cooley | |
| 4,865,073 A * | 9/1989 | Kocher | 137/412 |
| 4,988,978 A * | 1/1991 | Soto | 340/624 |
| 5,005,923 A * | 4/1991 | Dahnert | 312/201 |
| 5,155,311 A | 10/1992 | Utke | |
| 5,449,274 A * | 9/1995 | Kochan, Jr. | 417/8 |
| 5,728,987 A * | 3/1998 | Utke | 200/84 R |
| 5,829,303 A | 11/1998 | Fraser | |
| 6,149,390 A | 11/2000 | Fisher et al. | |
| 6,322,325 B1 * | 11/2001 | Belehradek | 417/2 |
| 6,461,114 B1 | 10/2002 | Lin | |
| 6,474,952 B1 | 11/2002 | Fisher et al. | |
| 7,307,538 B2 * | 12/2007 | Kochan, Jr. | 340/618 |
| 2006/0093492 A1 * | 5/2006 | Janesky | 417/366 |

* cited by examiner

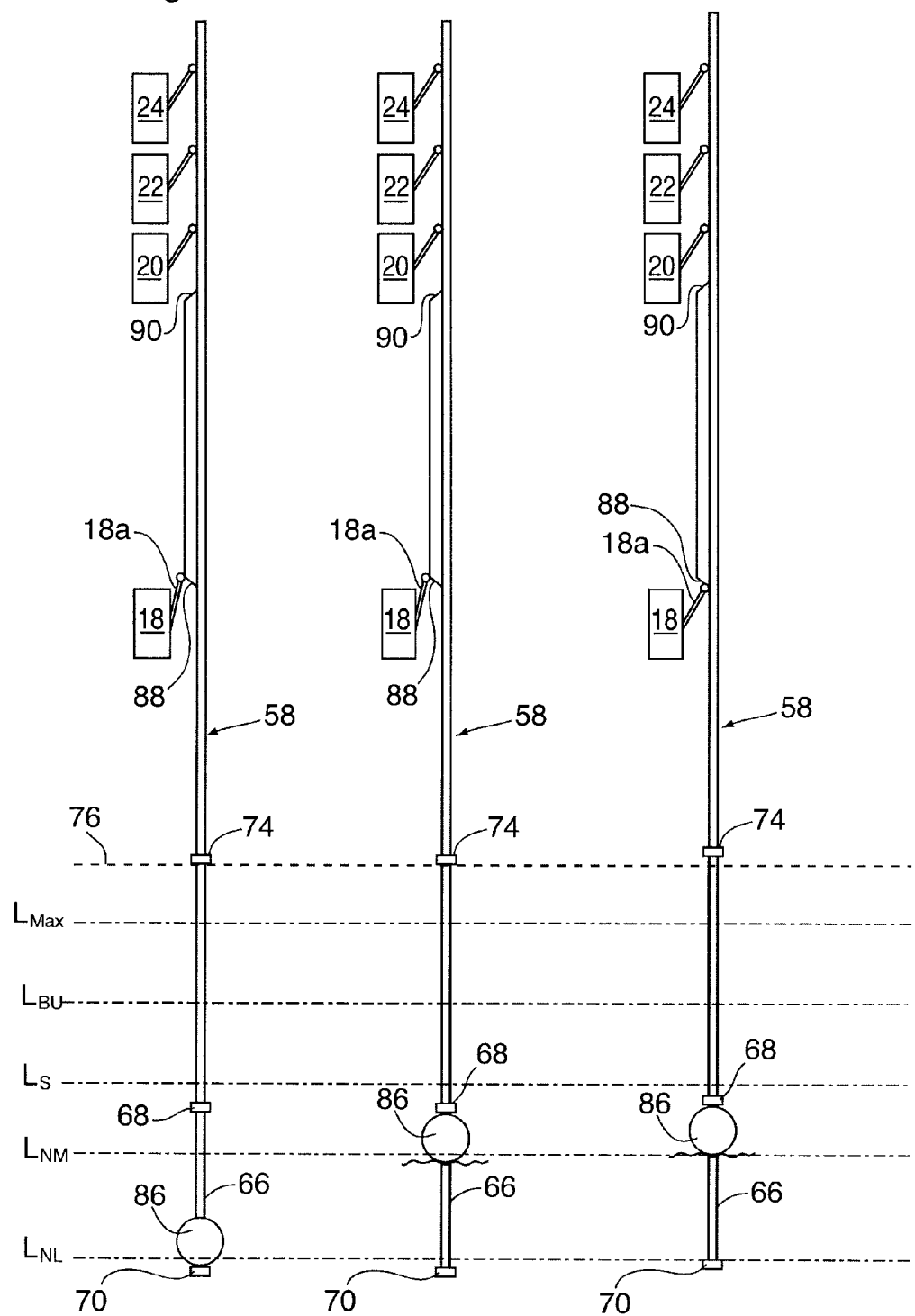

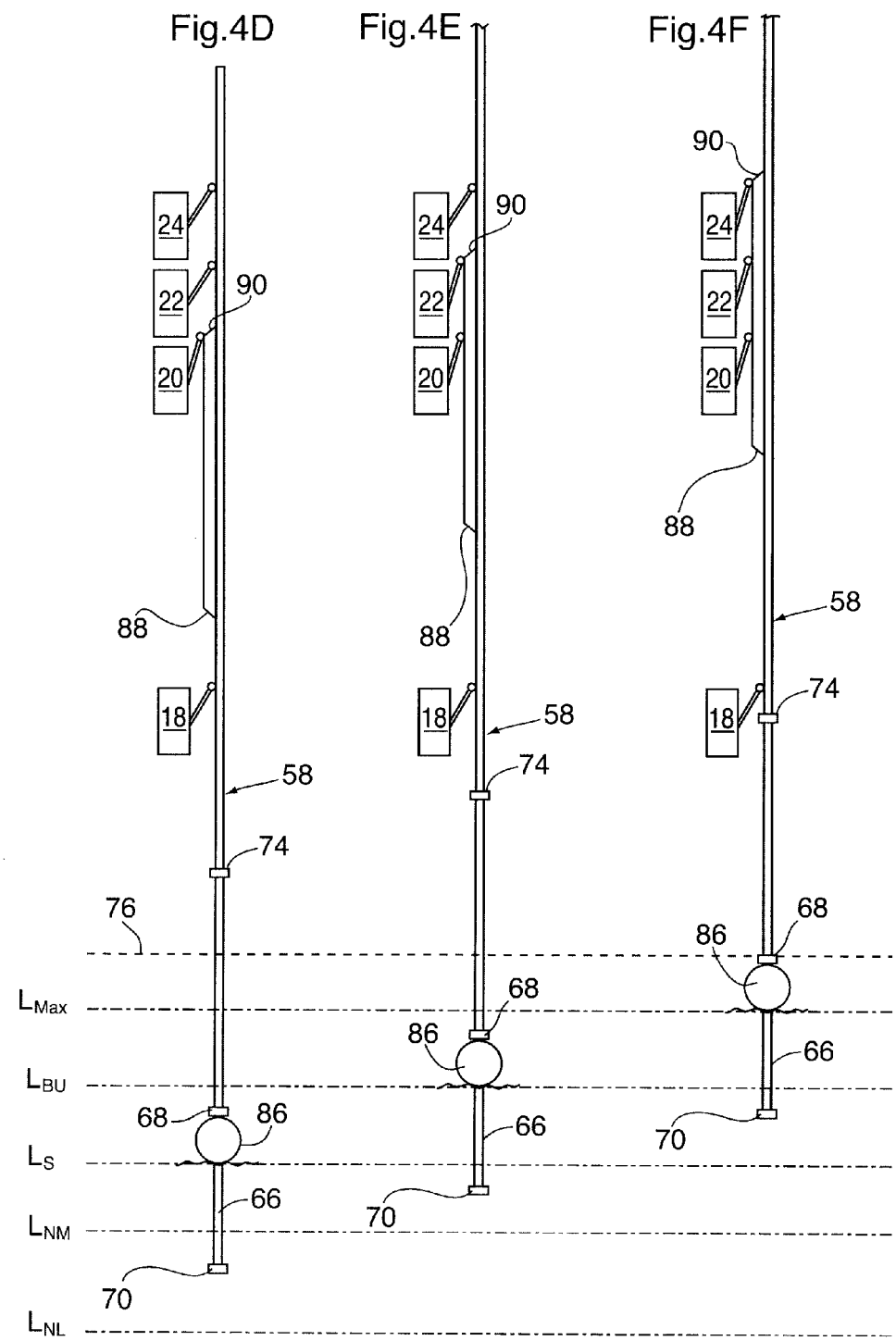

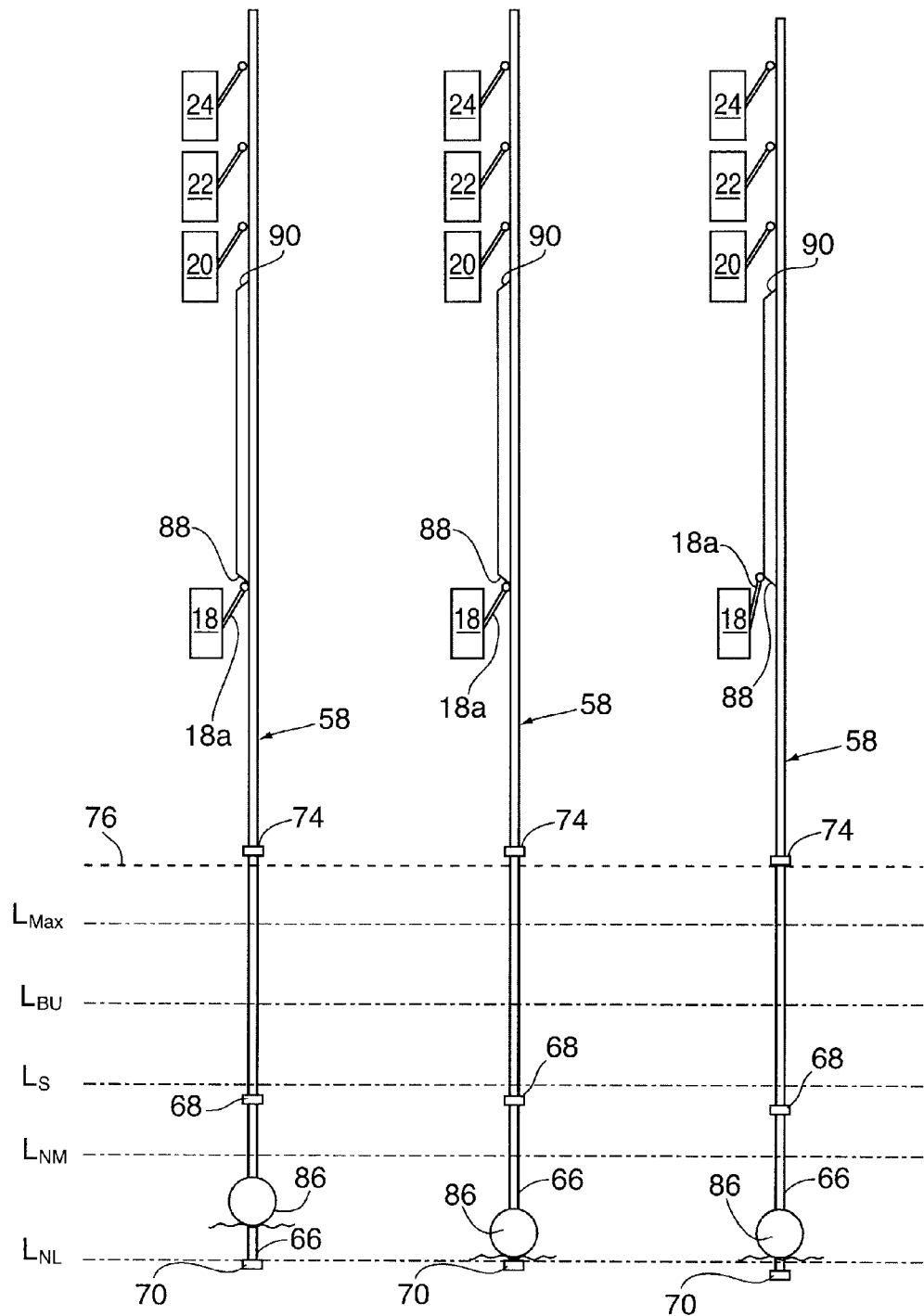

MULTIPLE SWITCH FLOAT SWITCH APPARATUS

FIELD OF THE INVENTION

This invention relates to a float switch apparatus for use in controlling the energization of multiple electric circuits in response to the level of liquid in a vessel, such as may be used to activate a sump pump motor, a backup sump pump motor and a high level alarm or a level indicating system.

BACKGROUND OF THE INVENTION

There are numerous structures known for monitoring the level of liquid in a vessel, such as a tank, vat or sump, and either providing outputs indicative of the level or taking various actions in response to the level, or both.

Many different level sensing technologies have been used or proposed for such structures. For example, some such systems are based on sensors responsive to changes of pressure, indicative of changes in liquid level. Other systems rely upon the use of electrical probes whose electrical properties change with changes in liquid level. However, many popular systems rely upon sensing the vertical displacement of a float floating on top of the liquid.

Float mechanisms have been used in a variety of ways.

In a conventional arrangement, a single float rises to a certain pre-determined level, at which point an electrical switch or contact of some type is closed, thus energizing an associated electrical circuit, such as an alarm or a pump motor.

Various systems disclose the use of multiple floats to perform multiple functions. For example, U.S. Pat. No. 3,932,853 discloses the use of one float to operate a sump pump in the normal manner and the use of a separate float to operate an independent mercury switch to trigger an alarm circuit. Similarly, U.S. Pat. Nos. 4,187,503, 4,255,747 and 4,456,432 disclose alarm devices operated by their own float mechanisms separate and apart from the normal operation of their respective sump pumps. A difficulty with such systems is that the use of multiple floats to control operation of multiple electric circuits can be problematic. For example, particularly as the number of electric circuits and floats increases, it may become difficult to locate same in the vessel or sump without interfering with each other.

One of the difficulties of a float-based system is the need to avoid cycling of the pump at or around a desired liquid level. For example, if a float actuator is arranged to trigger operation of a pump motor (and pump) at a particular level as soon as the pump has reduced the liquid level just below the target level, then the pump will turn off. If liquid is continuing to enter the vessel, then the liquid level will rise again, thus triggering pump operation again, thus causing the liquid level to drop until pump shut off, etc.

To avoid such cycling, it is well known to provide a structure by which the pump will turn on at a specified upper level, but only turn off at a specified lower level. There are many such structures directed to such end. For example, in a pivoting float arrangement, it is known to have a float attached to a pivoting arm. Inside the float, a movable weight is either momentarily held in position as liquid level changes or must traverse a specified distance before engaging another component, in either case causing a lag between the time when the operation is triggered and then subsequently shut off. Examples of such mechanisms are disclosed in: U.S. Pat. No. 4,755,640 (disclosing a weight slidably mounted on a shaft, with the weight having step and groove structures to delay movement of a weight which engages and disengages a switch) and U.S. Pat. No. 5,728,987 (disclosing a structure in which a ball moves within a raceway to control the position of an operating rod which in turn engages and disengages a switch).

As a further example, it is also known to provide a float mounted to a float rod which in turn is slidably connected to a pump activation mechanism. As liquid level rises, the float and float rod move upwardly until a lower stop on the float rod triggers the pump activation mechanism. At that point, the mechanism is then secured or latched in an ON position by a latching arrangement. As the pump operates, the liquid level decreases and the float and float rod move downwardly, with the lower stop on the float rod descending away from the pump activation mechanism. Eventually, an upper stop on the float rod comes into contact with the pump activation mechanism. At that point, as the liquid level continues to drop, the weight of the float and float rod is transferred to the upper stop and, when sufficient weight has been transferred, the latching arrangement releases to an OFF position, thus disengaging the pump. Examples of such latching mechanisms are disclosed in: U.S. Pat. No. 6,461,114 (disclosing a pivoting lever latched by a spring tab) and U.S. Pat. No. 6,474,952 (disclosing a movable actuator body slidably mounted to both the float rod and a housing).

As another but somewhat similar example, it is known to provide a float slidably mounted on a float rod. As liquid level rises, the float moves upwardly on the float rod until the float engages an upper stop on the float rod. As liquid level rises further, the float then pushes the float rod upwardly until the pump mechanism is triggered. At that point, the float rod itself is then secured or latched in position. As the pump operates, the liquid level decreases and the float moves downwardly, away from the upper stop on the float rod, until eventually the float comes into contact with a lower stop also attached to the float rod. At that point, as the liquid level continues to drop, the weight of the float is transferred to the lower stop and, when sufficient weight has been transferred, the latching mechanism releases the float rod, thus disengaging the pump. An example of such a latching mechanism is disclosed in: U.S. Pat. No. 5,155,311 (disclosing a magnetic latching arrangement).

The possibility of using a single float in combination with multiple switches has been previously recognized. For example, U.S. Pat. Nos. 4,064,755, 4,186,419, 5,829,303 and 6,149,390 all disclose the use of floats which carry one or more magnets and interact with one or more fixed magnetic reed switches or magnetic microswitches. Such systems can suffer from a number of disadvantages. For example, the switches themselves are mounted inside a relatively large diameter tube where they are protected from the liquid itself. As a result, the floats are generally toroidal or dough-nut shaped with the tube passing through the central hole. Floats of such type can be more prone to jamming on the tubes thus possibly making such apparatuses potentially unreliable. In addition, magnetic reed switches or magnetic microswitches themselves can be expensive and limited in the amount of electric power they can handle, for example on the order of 100 W or less, and may not be adequate to directly handle the power required to operate many electric circuits that may have to be activated in response to rising liquid level in a vessel. For example, many such switches may not be suitable for direct use in a circuit with a 0.5 HP (about 370 W) AC sump pump motor drawing about 3 A at 120V, which in fact may draw significantly more power on start up. To energize such a system, conventional reed switches would likely have to be used in conjunction a suitable relay switch. However, such combination systems are both more complicated and more expensive and may be less reliable.

As another example, U.S. Pat. No. 4,086,457 discloses a pivoting float mechanism which contains two or more mercury switches oriented at different, predetermined angles to energize its associated electrical circuits. One difficulty with such a pivoting structure is that it may only effectively work over a relatively modest range of liquid levels. In addition, installation and calibration of the structure to operate at the desired liquid levels can be difficult and inconvenient and such difficulties can be compounded as attempts are made to add additional switches to the structure. Moreover, mercury switches can be expensive and there are environmental issues associated with their use and disposal.

In view of the above, there thus remains a need for a simple and reliable float switch apparatus for controlling the energization of multiple electric circuits in response to liquid level using a single float.

SUMMARY OF THE INVENTION

The present invention is directed, in one aspect, to a float switch apparatus for controlling the energization of multiple electric circuits in response to the level of a liquid in a vessel. The apparatus has a guide structure adapted to be mounted in a fixed position relative to the vessel, a first micro-switch with a normal and an engaged position mounted to the guide structure and adapted to be connected into a first electric circuit to control the energization thereof, a second micro-switch with a normal and an engaged position mounted to the guide structure at a location above the first micro-switch and adapted to be connected into a second electric circuit to control the energization thereof, a float rod slideably mounted to the guide structure for reciprocating movement in a generally vertical direction in a zone above a resting position, the float rod having upper and lower float stops and the float rod additionally having a lower cam surface for releasing the first micro-switch from an engaged position to its normal position during upward movement of the float rod above the resting position and an upper cam surface for moving the second micro-switch from its normal position to its engaged position during upward movement of the float rod, and, a float slideably mounted to the float rod between the upper and lower float stops, which float is adapted to float with the level of liquid in the vessel.

In another aspect, the invention is directed to a pump system for pumping liquid from a vessel and operating a secondary electric circuit associated therewith. The system comprises a power source, an electric motor connected to a primary pump operable to pump liquid from the vessel, a system actuator comprising a guide structure mounted in a fixed position relative to the vessel, a normally-closed micro-switch having a normal and an engaged position mounted to the guide structure and operatively connected between the electric motor and the power source, a normally-open micro-switch having a normal and an engaged position mounted to the guide structure at a location above the normally-closed micro-switch and operatively connected into the secondary electric circuit to control the energization thereof, a float rod slideably mounted to the guide structure for reciprocating movement in a generally vertical direction in a zone above a resting position, the float rod having upper and lower float stops and the float rod additionally having a lower cam surface for releasing the normally-closed micro-switch from an engaged position to its normal position during upward movement of the float rod above the resting position and an upper cam surface for moving the normally-open micro-switch from its normal position to its engaged position during upward movement of the float rod, and, a float slideably mounted to the float rod between the upper and lower float stops, which float floats with the level of liquid in the vessel.

BRIEF DESCRIPTION OF THE DRAWINGS

Preferred embodiments of the present invention are illustrated in the attached drawings, in which:

FIGS. 4a to 4i is a series of schematic diagrams showing the operation of a float switch apparatus according to the invention;

DETAILED DISCLOSURE

Figure 1:
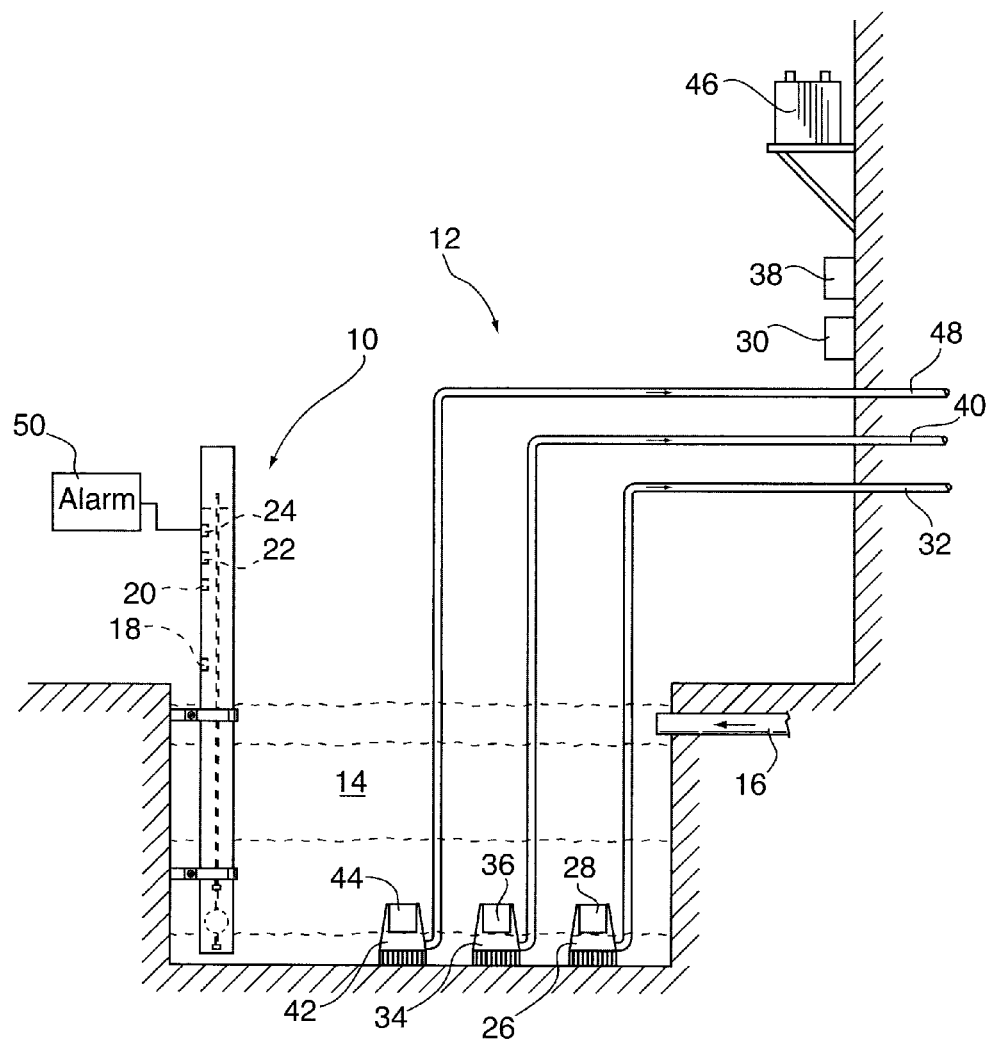
FIG. 1 is a schematic diagram of a system incorporating the invention.

Referring to FIG. 1, there is generally shown a float switch apparatus 10 according to the invention used in connection with the controlling of a pump system generally indicated as 12. Pump system 12 is used to control the level of a liquid, such as water, waste water or sewage, in a vessel, such as a tank, vat or sump 14. Liquid enters sump 14 through inlet 16.

As described below in detail, float switch apparatus 10 incorporates a number of switches including a first switch 18 and a second switch 20. In the illustrated embodiment, float switch apparatus 10 also incorporates two additional switches, third switch 22 and fourth switch 24. Switches 18, 20, 22 and 24 are used for controlling the energization of various electric circuits in response, as explained in detail below, to the level of liquid in sump 14.

Pump system 12, in the illustrated embodiment, incorporates a primary pump 26 which is connected to and driven by an electric motor 28. As shown, the combination of pump 26 and motor 28 is in the form of a submersible pump, in which pump 26 and motor 28 are built into the same sealed housing. However, in other embodiments, other pumping arrangements could be used. Motor 28 is electrically connected to (for clarity, wiring connections are not shown in FIG. 1) and driven by an AC power source, such as a conventional 120 V AC electrical outlet 30. The discharge of pump 26 is connected to discharge outlet 32.

Similarly, in the illustrated embodiment, pump system 12 also incorporates a secondary pump 34 connected to and driven by electric motor 36, again all in the form of a submersible pump although other pump-motor arrangements could be used. Motor 36 is also electrically connected to (for clarity, again wiring connections are not shown in FIG. 1) and driven by an AC power source, such as a conventional 120 V or 240 V AC electrical outlet 38. If the power handling capacity of the power source for motor 28 is sufficient to handle the operation of two pump motors, the power source for motor 36 may (if allowed by local electrical codes) be the same as for motor 28, for example the same outlet 30. However, for redundancy reasons (e.g. in case the normal electrical system is not functioning properly), it may in fact be desired to ensure that the power source for motor 36 is different than that for motor 28. For example, outlet 38 may be powered by a backup generator operating during a power failure. The discharge of pump 34 is connected to discharge outlet 40.

Pump system 12 as shown also incorporates a backup pump 42 connected to and driven by a direct current motor 44. Motor 44 is also electrically connected to (for clarity, again wiring connections are not shown in FIG. 1) and driven by a DC power source, such as a battery 46. Although not shown, battery 46 will preferably be connected to a power source, such as a trickle charger, so as to be fully charged during periods when battery 46 is not being used to drive DC motor 44. The discharge of pump 42 is connected to discharge outlet 48.

The discharges of pumps 26, 34 and 42 may be connected to a common discharge line (not shown).

Figure 2A:
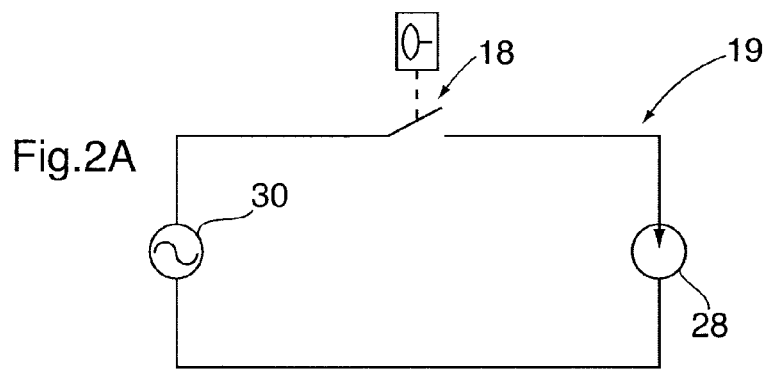
FIGS. 2A through 2D is a series of electrical circuit diagrams illustrating the electrical connection of electrical components in a system incorporating the invention.

As noted, for clarity, FIG. 1 does not show physical wiring. Instead, the electrical connections for the above described components are illustrated in FIGS. 2A to 2D. In particular, as shown in FIG. 2A, electric motor 28 is connected by suitable wiring in series to both AC power source 30 and first switch 18 to define a circuit 19. When first switch 18 is closed, electric motor 28 is energized and, referring back to FIG. 1, pump 26 operates to pump liquid from sump 14 to outlet 32.

Figure 2B:
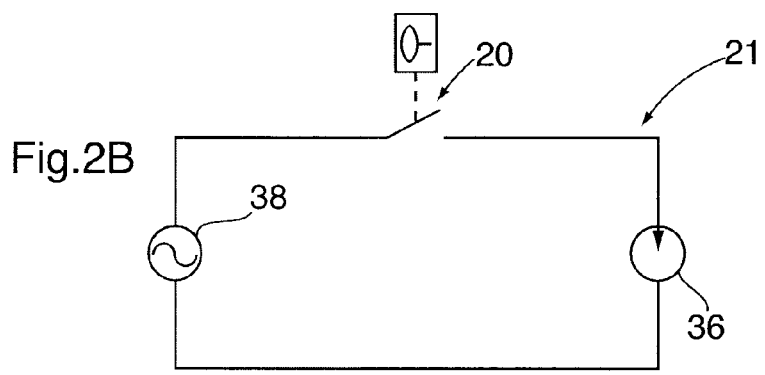

As shown in FIG. 2B, electric motor 36, AC power source 38 and second switch 20 are electrically connected in series by suitable wiring to define a circuit 21. When second switch 20 is closed, electric motor 36 is energized and, referring back to FIG. 1, pump 34 operates to pump liquid from sump 14 to outlet 40.

Figure 2C:
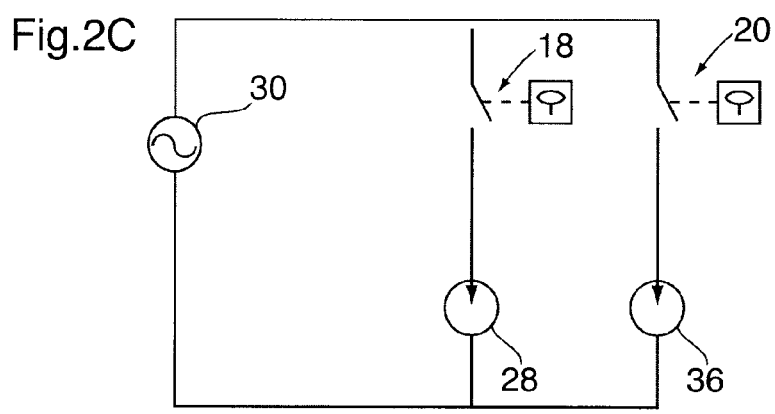

As shown in FIG. 2C, in a case where the power handling capacity of the power source for motor 28 is sufficient to handle the operation of two pump motors, the power source for motor 36 may be the same as for motor 28, for example the same outlet 30.

Figure 2D:
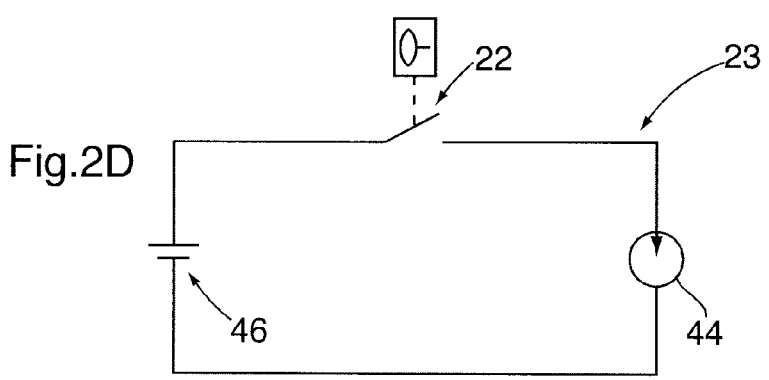

As shown in FIG. 2D, motor 44, DC power source 46 and third switch 22 are electrically connected in series by suitable wiring to define a circuit 23. When third switch 22 is closed, electric motor 44 is energized and, referring back to FIG. 1, pump 42 operates to pump liquid from sump 14 to outlet 48.

As schematically shown in FIG. 1, fourth switch 24 is operably connected to an alarm device or system 50, whereby operation of fourth switch 24 triggers predetermined activity by alarm device or system 50.

Although FIG. 1 illustrates the use of four switches and a corresponding four particular electrical circuits, it will be appreciated that the apparatus and system of the invention may be used in connection with any desired number of switches and any desired electrical circuits. For example, switches may be used to trigger liquid level indicating circuits, different alarm devices, different pumping arrangements, or different backup arrangements. The devices and circuits to be included in a system according to the invention will for many common applications be selected from the group consisting of a power source and an AC electric motor for operating a primary pump, a power source and an AC electric motor for operating a secondary pump, a power source and a DC electric motor for operating a backup pump, a starter circuit of an electrical generator to which a backup pump driven by an electric motor is connected, one or more liquid level indicating circuits and an alarm system circuit.

It will also be appreciated that for some applications a more basic embodiment of the invention may be appropriate. For example, an apparatus and system incorporating only a first switch for activating a primary pump motor and a second switch for activating a secondary activity, such as triggering a secondary or backup pump motor or an alarm, may be adequate. A possible third switch for activating an additional secondary activity, again such as triggering a secondary or backup pump motor or an alarm, may be included if desired.

Figure 3:
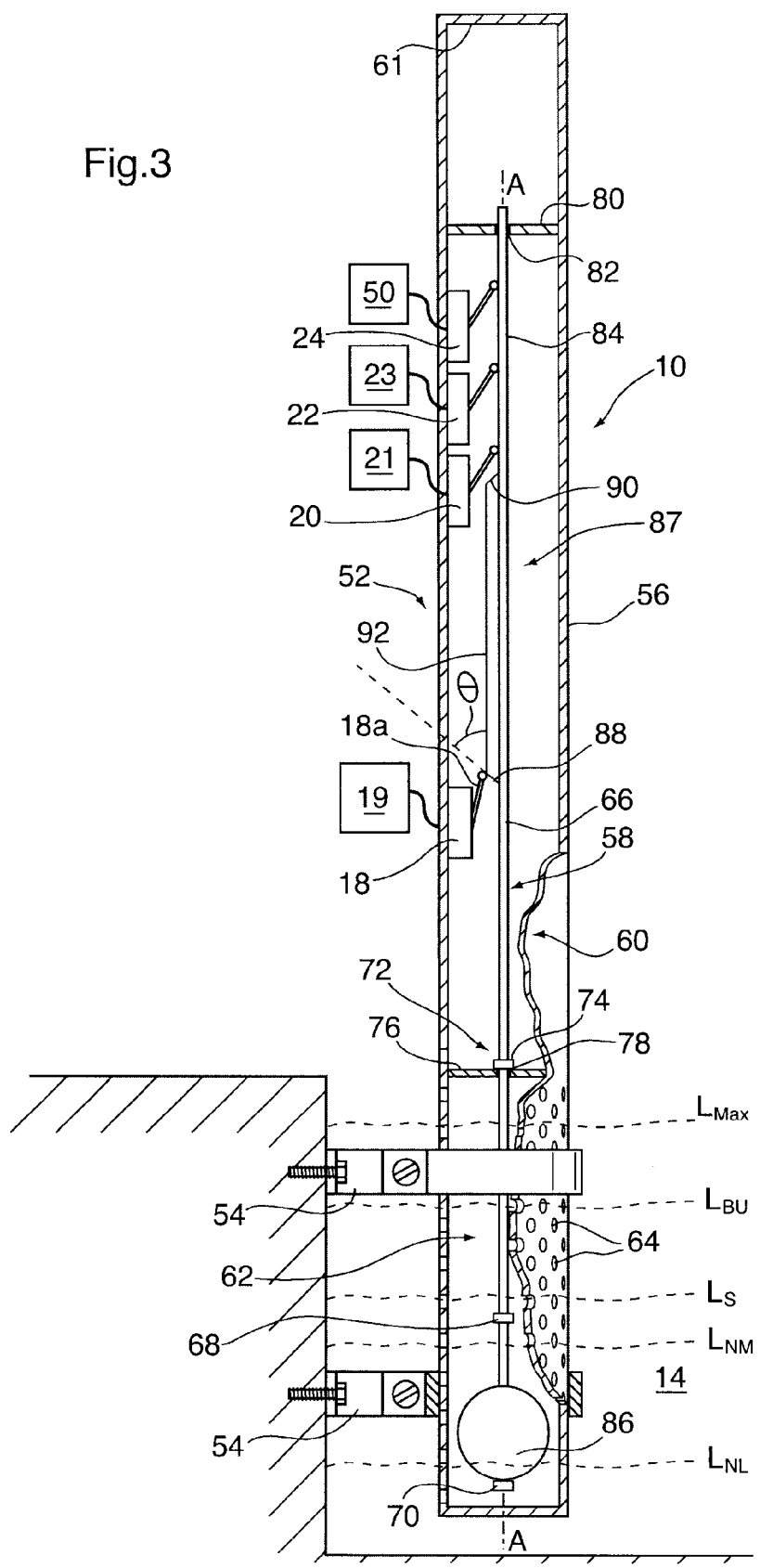
FIG. 3 is a cross-section of a float switch apparatus according to the invention.

Referring now to FIG. 3, a float switch apparatus 10 according to the invention is shown in greater detail. In particular, a guide structure 52 is mounted in a fixed position relative to sump 14. As shown, guide structure 52 is mounted by means of clamping brackets 54 to the side of sump 14. Other mounting arrangements may be used. In the illustrated embodiment, guide structure 52 comprises a guide tube 56 oriented in a generally vertical direction.

A float rod assembly 58 is, as described below in detail, slidably mounted to guide structure 52 for reciprocating movement in a generally vertical direction along an axis A-A in a zone above a pre-determined resting position. In FIG. 3, float rod assembly 58 is mounted inside guide tube 56 and is shown in such resting position.

Switches 18, 20, 22 and 24 are mounted to the guide structure 52 at positions higher than the anticipated maximum level $L_{Max}$ of liquid in sump 14. As shown, switches 18, 20, 22 and 24 are mounted to the interior of guide tube 56, in particular to an upper section 60 thereof substantially located above the maximum level $L_{Max}$. Upper section 60 is preferably closed in airtight manner at the top by cap 61. In the preferred embodiment shown, guide tube 56 also has lower section 62, at least portions of which will be immersed in any liquid that may be present in sump 14.

Lower section 62 of guide tube 56 serves to protect the lower portions of float rod assembly 58 from coming into contact with debris or other objects, floating or otherwise, that may be present in or introduced into sump 14. To allow liquid in sump 14 to enter the lower section 62, openings 64 are provided in lower section 62 of guide tube 56. Lower section 62 thus essentially defines a grill arrangement.

In some embodiments, it may be desired not to have a lower section of guide tube 56 immersed in the liquid. In such an embodiment, lower portions of float rod assembly 58 would depend in an exposed manner into the liquid in sump 14 and an alternate mounting structure would have to be used to support guide tube 56 above sump 14.

Float rod assembly 58 comprises a float rod 66 which on a lower section thereof has an upper float stop 68 and a lower float stop 70. In addition, float rod 66 has a reference stop structure 72 which will cooperate with a fixed structure to hold float rod assembly at a predetermined resting position. In the illustrated embodiment, reference stop structure 72 comprises a limit stop 74 which will engage with and be supported on a support bracket 76 attached to guide tube 56. Although shown in a middle section of float rod assembly 58, reference stop structure 72 could be located, as desired, at other locations along float rod assembly 58, such as at the top or bottom thereof. In either such case, suitable fixed structures with which such reference stop structure 72 may cooperate would have to be provided as needed, for example an additional support bracket or the bottom of sump 14.

Float rod assembly 58 additionally has a cam surface portion 87 defining a lower cam surface 88 and an upper cam surface 90, joined by a middle cam surface 92. Cam surface 88 is shaped whereby to intersect float rod 66 at an angle θ, the selection of which is described below.

In the illustrated embodiment, to achieve the slidable mounting of float rod assembly 58 to guide tube 56, a hole 78 is provided in support bracket 76. In addition, an upper support bracket 80 with hole 82, aligned with hole 78 to define the axis A-A, is provided. A middle portion of float rod 66 passes through hole 78 and an upper guide portion 84 of float rod 66 passes through hole 82. The upper section 60 of guide tube 56 is tall enough to provide sufficient headroom to allow float rod assembly 58 to rise to its intended maximum height. In this manner, the upper portion 84 of float rod assembly 58 is fully protected inside guide tube 56 as float rod assembly 58 moves through its full range of motion.

Other mounting arrangements to allow slidable mounting of float rod assembly 58 to guide tube 56, such as disclosed below, are possible.

With continuing reference to FIG. 3, a float 86 is slidably mounted, by means of a hole along its central axis (not shown), to float rod 66 between the upper and lower float stops 68 and 70. Float 86 is sized and shaped to float, bearing the weight of float rod assembly 58, on the surface of the liquid in sump 14. As float 86 rises with the rising liquid level in sump 14, it will come into contact with upper float stop 68 and thereafter push float rod assembly 58 upwardly. Generally, as liquid level in sump 14 drops, float 86 will move downwardly in corresponding manner, bearing the weight of float rod assembly 58, unless float rod assembly 58 has been secured in a raised position (which, as described below in detail, may occur in certain positions).

As described above, switches 18, 20, 22 and 24 are mounted to the interior of guide tube 56 at positions above the anticipated maximum level $L_{Max}$ of liquid in sump 14. Switches 18, 20, 22 and 24 are snap-action microswitches. In general, such microswitches are robust and relatively inexpensive devices which are particularly suitable for the present application. Such microswitches typically have a long life expectancy and can survive millions of cycles of operation. Many such microswitches are capable of handling the electrical power required by the typical electrical circuits with which the present invention would be used. They have an established track record of reliable performance under a wide variety of conditions. Examples of suitable microswitches for the present application include those sold by Omron Electronics Components LLC under the model no. V-15G6-1C25-K and by C&K Components under the model no. TM-CJ-G6-S-A15-40-C.

A snap-action microswitch is biased by the resilience of its internal components into a normal position. A modest amount of force, herein referred to as the 'actuation force', must be applied to a switch's actuator, e.g. a button or a lever arm, to toggle the switch from its normal position into its engaged position.

Such snap-action microswitches typically have internal wiring connections which allow a user to select whether the switch will be, in its normal position, wired as "normally-open" (or "NO") or "normally-closed" (or "NC"). The former is sometimes referred to as a "push-to-make" switch and the latter as a "push-to-break" switch.

First switch 18 is mounted to the interior of guide tube 56 at a location whereby during upward movement of the float rod assembly 58 above its resting position the float rod assembly 58 will at a first activation position (corresponding to a normal maximum level $L_{NM}$ of liquid in sump 14), as described in detail below, trigger activation of first switch 18 whereby to energize first electric circuit 19. First switch 18 is wired as "normally-closed".

More specifically, first switch 18 and float rod assembly 58 in its resting position are positioned relative to each other whereby the biasing of switch 18 holds switch actuator 18a against middle cam surface 92 in which switch 18 in its engaged position. Because switch 18 is wired as "normally-closed", in its engaged position, the switch is in fact "open" and circuit 19 is not energized. Upward movement of the float rod assembly 58 brings lower cam surface 88 into contact with the switch's actuator 18a. As the cam surface 88 continues moving upwardly, the biasing of switch 18 maintains contact between the switch actuator 18a and lower cam surface 88, eventually releasing switch 18 to its normal position, which in the case of switch 18 is "closed". As switch 18 is closed in this manner, circuit 19 is energized and pump 26 begins to operate.

Assuming pump 26 is performing properly, the level of liquid in sump 14 drops and float 86 moves downwardly accordingly. Under the influence of gravity, float rod assembly 58 tends to move downwardly as well but encounters the resistance of switch 18's biasing force. Lower cam surface 88 comes to bear on switch actuator 18a.

The angle θ of lower cam surface 88 to axis A-A in essence defines a ramp or wedge which transfers a portion of the weight of float rod assembly 58, as an actuation force, to switch actuator 18a. The precise angle θ selected may depend on the design of the particular microswitch selected for use as switch 18. For example, if switch 18 has a lever arm actuator angled at about 10 degrees to the microswitch body, angle θ will preferably be between about 35 and 45 degrees and more preferably about 40 degrees. As another example, if switch 18 has a button actuator or a lever arm actuator essentially parallel to the switch body, preferably, angle θ will be between about 40 and 50 degrees and more preferably about 45 degrees. It will be appreciated that, in the case of a microswitch with a lever arm actuator, angle θ should not be so steep that the weight of float rod assembly 58 bearing thereon tends to move or bend the lever arm outwardly or away from the microswitch body. Despite such preferred ranges for angle θ, angle θ may be any angle which will support the weight of float rod assembly 58 by itself yet transfer to the switch actuator a sufficient portion of the combined weight of float rod assembly 58 and float 86 to overcome the actuation force of the switch.

When the liquid level and float 86 first start to move downwardly, the weight of the float 86 does not bear on float rod assembly 58. Thus, float rod assembly 58 will be supported, in effect latched, by switch 18 at a first activation position with switch 18 "closed" and pump 26 operating.

If pump 26 is not performing properly or adequately, liquid level in sump 14 will continue to rise, as will float 86 and float rod assembly 58. Upward movement of the float rod assembly 58 moves lower cam surface 88 away from switch 18 and switch 18 therefore stays in its "normally-closed" position with circuit 19 energized and pump 26 operating.

In the illustrated embodiment, second switch 20 is mounted to the interior of guide tube 56 at a location above first switch 18 whereby, during further upward movement of float rod assembly 58 from its first activation position, the float rod assembly 58 will at a second activation position (corresponding to a secondary level $L_S$ of liquid in sump 14), as described in detail below, trigger activation of second switch 20 whereby to energize second electric circuit 21. Second switch 20 is wired as "normally-open". Thus, in its normal position, the switch is "open" and circuit 21 is not energized. Upward movement of the float rod assembly 58 brings upper cam surface 90 into contact with switch 20's actuator. As the cam surface 90 continues moving upwardly, the force applied thereby exceeds switch 20's actuation force thus moving switch 20 to its engaged and "closed" position. As switch 20 is closed in this manner, circuit 21 is energized and pump 34 begins to operate. With further upward movement of float rod assembly 58, the biasing of switch 20 holds its actuator in contact with middle cam surface 92 whereby the switch will be held in its engaged and "closed" position. In some cases, the biasing force of a microswitch in its engaged position may create sufficient static friction between float rod assembly 58 and guide tube 56 that float rod assembly 58 may be held in place, if liquid level and float 86 descend.

In similar manner, in the illustrated embodiment, additional third switch 22 and fourth switch 24 are mounted to the interior of guide tube 56 at similar predetermined locations above upper cam surface 90 whereby to activate third and fourth electric circuits 23 and 50, for example at liquid levels corresponding to a level $L_{BU}$ at which it may be desired to engage a backup battery-operated pump 42 and a maximum level $L_{Max}$ at which alarm device or system 50 would be activated. Third and fourth switches 22 and 24 are, like switch 20, wired as "normally-open" and operate in essentially the same manner as switch 20.

Referring to FIGS. 4a to 4i, the sequence of operations of float switch apparatus 10 is illustrated. More specifically, FIG. 4a illustrates the operating components of float switch apparatus 10 in its resting position when sump 14 is empty of liquid. In this position, limit stop 74 supports float rod assembly 58 in its resting position in cooperation with support bracket 76 shown as a dashed line. Float 86 rests, under the influence of gravity, on lower float stop 70. First switch 18 is held in its engaged position and thus, because first switch 18 is "normally-closed", first switch 18 is in fact open and first electric circuit 19 is not energized. Second, third and fourth switches 20, 22 and 24 are in their normal positions and, because these are each "normally-open" switches, the second, third and fourth electric circuits 21, 23 and 50 respectively are also not energized.

As the liquid level in sump 14 rises, float 86 floats on the surface of the rising liquid, moving upwardly on float rod 66 until, as shown in FIG. 4b, float 86 comes into contact with upper float stop 68.

Thereafter, as shown in FIG. 4c, as liquid level continues to rise, float 86 continues to rise, pushing float rod assembly 58 upwardly. Only a slight upward movement from the resting position allows the biasing of first switch 18 to release switch 18 from its engaged position to its normal position. Given that first switch 18 is "normally-closed", the upward movement of float rod assembly 58 in this manner allows first switch 18 to close, thus energizing first electric circuit 19. In the illustrated embodiment, the primary pump 26 will begin to operate.

In normal operation, assuming pump 26 is operating properly and its output is sufficient to handle the volume of liquid flowing through inlet 16 into sump 14, then liquid will be pumped from sump 14 by pump 26, thus lowering the level of liquid in sump 14. As the liquid level drops, the actuator 18a of first switch 18 will hold float rod assembly 58 in place because, as described above, the weight of float rod assembly 58 acting through its lower cam surface 88 is inadequate to generate sufficient force to overcome the actuation force of first switch 18. Accordingly, float rod 58 stays held in the position illustrated in FIG. 4c and pump 26 continues to operate.

As the liquid level drops, as shown in FIG. 4g, float 86 slides downwardly on float rod 66 until, as shown in FIG. 4h, float 86 comes into contact with lower float stop 70. As the liquid level drops slightly from that position, an increasing portion of the weight of float 86 is transferred to lower float stop 70. As the weight increases, eventually sufficient force is applied by lower cam surface 88 to the actuator 18a of first switch 18 to overcome its actuation force. At that instant, the latching of float rod assembly 58 is released and float rod assembly 58 quickly drops under gravity to its resting position, as shown in FIG. 4i, where once again limit stop 74 comes into cooperating contact with support bracket 76 in order to hold float assembly 58 in its resting position. The engagement of first switch 18 returns switch 18 from its "normally-closed" position to an "open" position thus breaking circuit 19 and turning off the operation of primary pump 26. No more liquid is pumped from sump 14. Thus, FIG. 4i illustrates a normal low level $L_{NL}$ of liquid in sump 14. FIG. 4c represents the normal maximum level $L_{NM}$ of liquid in sump 14.

However, in the event that primary pump 26 is not operating normally for any reason or has an inadequate capacity for the amount of liquid entering sump 14 at inlet 16, the liquid will continue to rise past the position shown in FIG. 4c. As the liquid rises, float 86 continues to float upwardly, pushing float rod assembly 58 upwardly until, as shown in FIG. 4d, at a secondary liquid level $L_S$, upper cam surface 90 engages and operates second switch 20. As second switch 20 is "normally-open", its engagement closes the switch and energizes second electric circuit 21, such as may be used to operate secondary pump 34. If operation of secondary pump 34 is sufficient to reduce the level of liquid in sump 14, then float 86, still supporting the weight of float assembly 58 by means of upper float stop 68, moves downwardly, releasing switch 20, via upper cam surface 90, to its normal "open" position, thus breaking second electric circuit 21. If second electric circuit 21 is operating a secondary pump, such as pump 34, pump 34 may cycle around the position shown in FIG. 4d, unless if desired other structure is provided (for example as shown and described below in relation to FIG. 7) or unless the biasing force of switch 20 generates sufficient static friction to hold float rod assembly 58 in place.

If however the liquid level continues to rise above level $L_S$, then float 86 and float rod assembly 58 will continue to float upwardly until, as shown in FIG. 4e, upper cam surface 90 engages third switch 22 at level $L_{BU}$. Activation of the "normally-open" third switch 22 energizes third electric circuit 23, which in the example comprises a backup battery-operated motor 44 for operating backup pump 42. As described above in relation to secondary pump 34, backup pump 42 may cycle around the position shown in FIG. 4e. The second switch 20 and first switch 18 both remain in their closed positions thus maintaining the activation of both first and second electric circuits 19 and 21.

If liquid level in sump 14 continues to rise past level $L_{BU}$, then float 86 and float rod assembly 58 will continue to float upwardly until, as shown in FIG. 4f, upper cam surface 90 engages fourth switch 24 at level $L_{Max}$, thus energizing a fourth electric circuit which in the example is alarm device or system 50.

Further rise in liquid in sump 14 above level $L_{Max}$ will be beyond the capacity of the particular apparatus 10 as designed and represents a catastrophic failure of the pump system 12 beyond any normal range of operating parameters. As noted above, in other embodiments, however, there could be essentially any number of switches energizing any desired number and type of electric circuits and initiating such actions as may be required.

It will be appreciated that the airtight enclosure defined by the closed upper section 60 of guide tube 56 and cap 61 will, as liquid level rises, trap air thereinside which in turn will slow or resist further rise of liquid inside guide tube 56, Such an arrangement serves to act, in case of a catastrophic failure as described, as an electrical safety measure by delaying or preventing electrical short circuits which might occur sooner if the liquid were to rise up to the level of switches 18, 20, 22 or 24.

Figure 5:
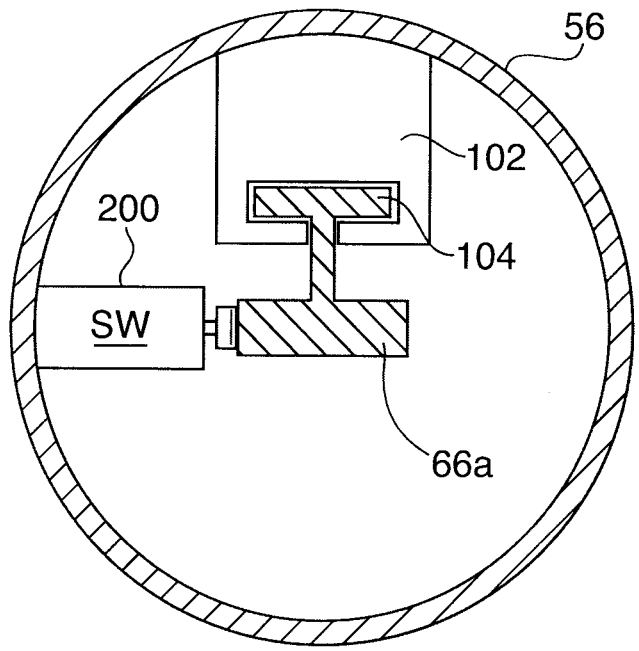
FIG. 5 is a transverse cross-sectional view of an alternate structure for slidably mounting the float rod assembly to the guide structure in an apparatus according to the invention.
Figure 6:
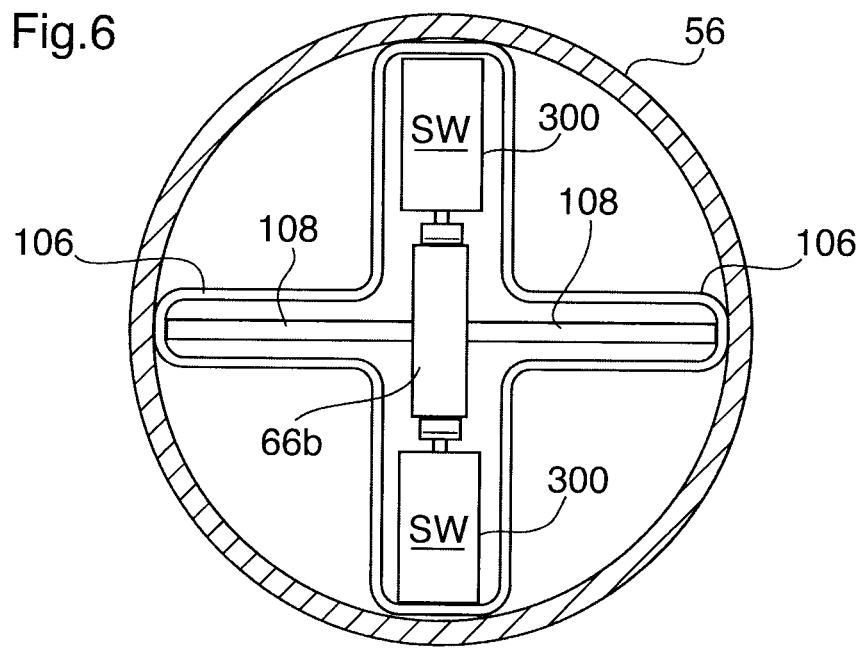
FIG. 6 is a transverse cross-sectional view of an alternate structure for slidably mounting the float rod assembly to the guide structure in an apparatus according to the invention.
Figure 8:
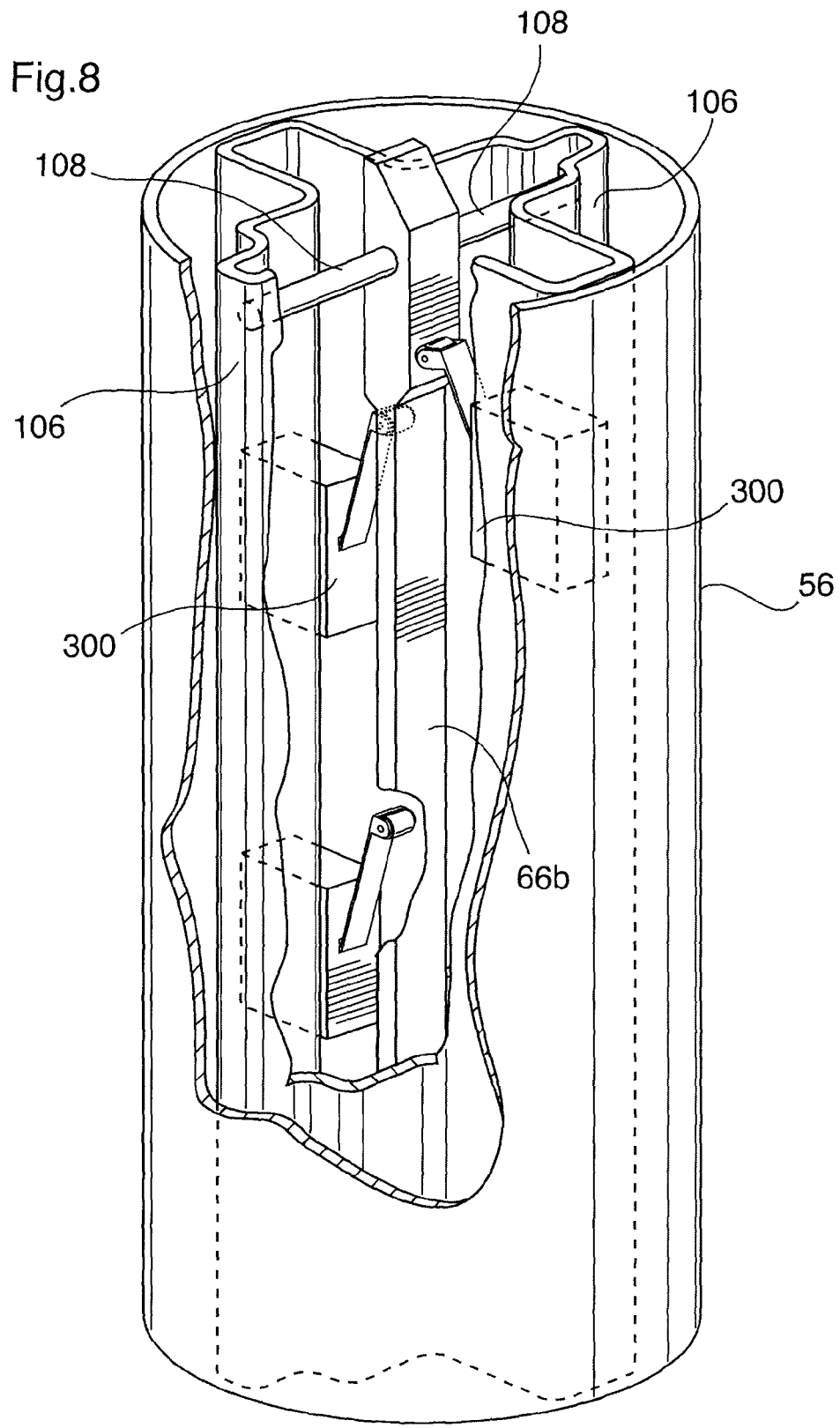
FIG. 8 is a cut-away perspective view of the embodiment of the invention shown in FIG. 6.

As noted above, different mounting arrangements to allow slidable mounting of float rod assembly 58 to guide tube 56 are possible. For example, as shown in FIG. 5, guide tube 56 may be provided with an internal track structure 102 within which a cooperating structure 104 of float rod 66a may travel relative to tube 56 and one or more switches 200. Alternatively, as shown in FIGS. 6 and 8, guide tube 56 may be provided with alternate internal track structures 106 within which cooperating structures 108 of float rod 66b may travel relative to tube 56 and one or more switches 300.

Figure 7:
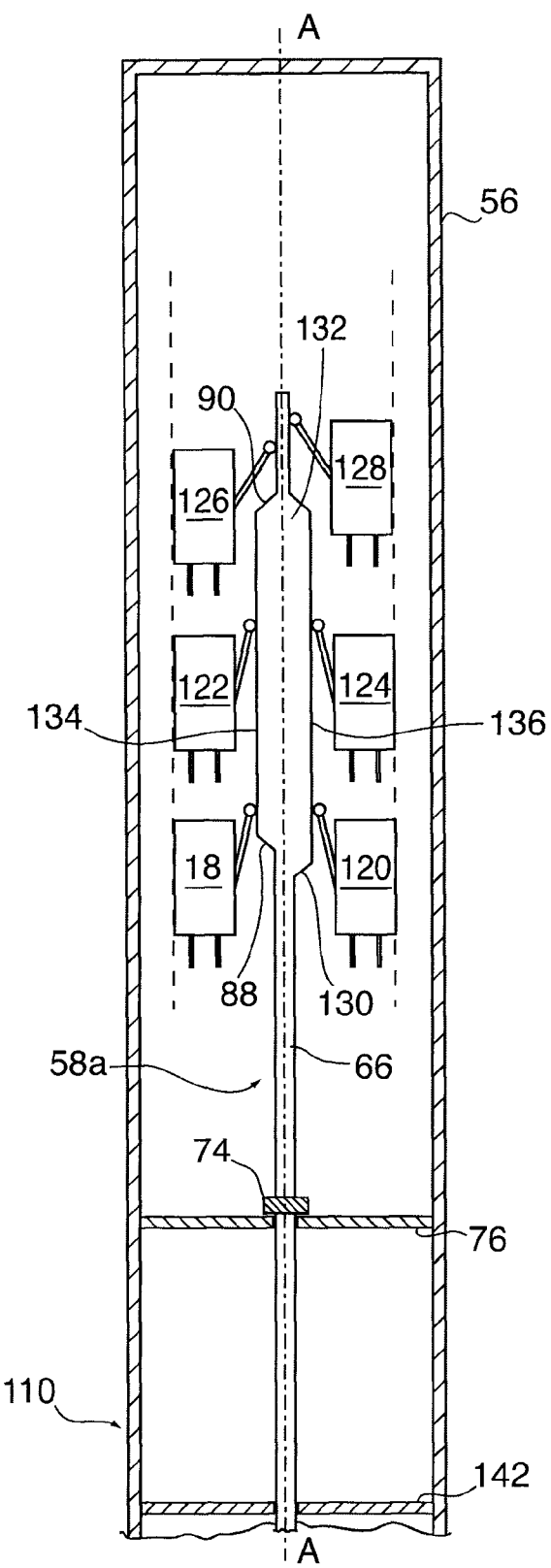
FIG. 7 is a longitudinal cross-section of an upper end of an alternate embodiment of an apparatus according to the invention.

As a further alternative suitable for some embodiments, with a mounting structure 110 as shown in FIG. 7, an upper end of float rod assembly 58a may be supported along axis A-A in cantilever fashion. In particular, float rod 58a is supported by a more robust bracket arrangement represented by support bracket 76 and an additional support bracket 142.

In the embodiment of the invention illustrated above in FIGS. 1 to 4i, switches 18, 20, 22 and 24 are shown mounted on the same side of guide tube 56 and cam surfaces 88 and 90 are correspondingly shown on one side of float rod assembly 58. In other embodiments, for example as shown in FIG. 7, although a first switch 18 may be mounted essentially as described above, additional snap-action microswitches may be mounted to guide tube 56 at various positions around guide tube 56 at such locations as may be desired to control the energization of multiple electric circuits. In such an embodiment, in addition to the lower and upper cam surfaces 88 and 90 as described above, additional cam surfaces such as additional lower cam surface 130 and additional upper cam surface 132 may be provided on float rod 66 to control the operation of additional switches 120 to 128 in such manner as may be desired. It will be noted that in this alternate embodiment switch 120 is, like switch 18, of the "normally-closed" type. Lower cam surface 130 has a shape similar to that of lower cam surface 88. Accordingly, switch 120 provides similar latching functionality as switch 18, as was described above in detail. If additional switch 120 controls the operation of a secondary backup pump, the cycling of such secondary can be avoided if desired.

Switches 122 and 124 can respectively be held in engaged positions by middle cam surface 134 (extending from lower cam surface 88 to upper cam surface 90) and middle cam surface 136 (extending from lower cam surface 130 to upper cam surface 132) until they are released to their normal positions as cam surfaces 88 and 130 respectively pass thereby. Accordingly, these switches 122 and 124 can additionally be provided, in similar manner to switch 120, with the latching capability of switch 18. They may thus be used to operate additional secondary or backup pumps, thus avoiding pump cycling if desired.

Figure 9:
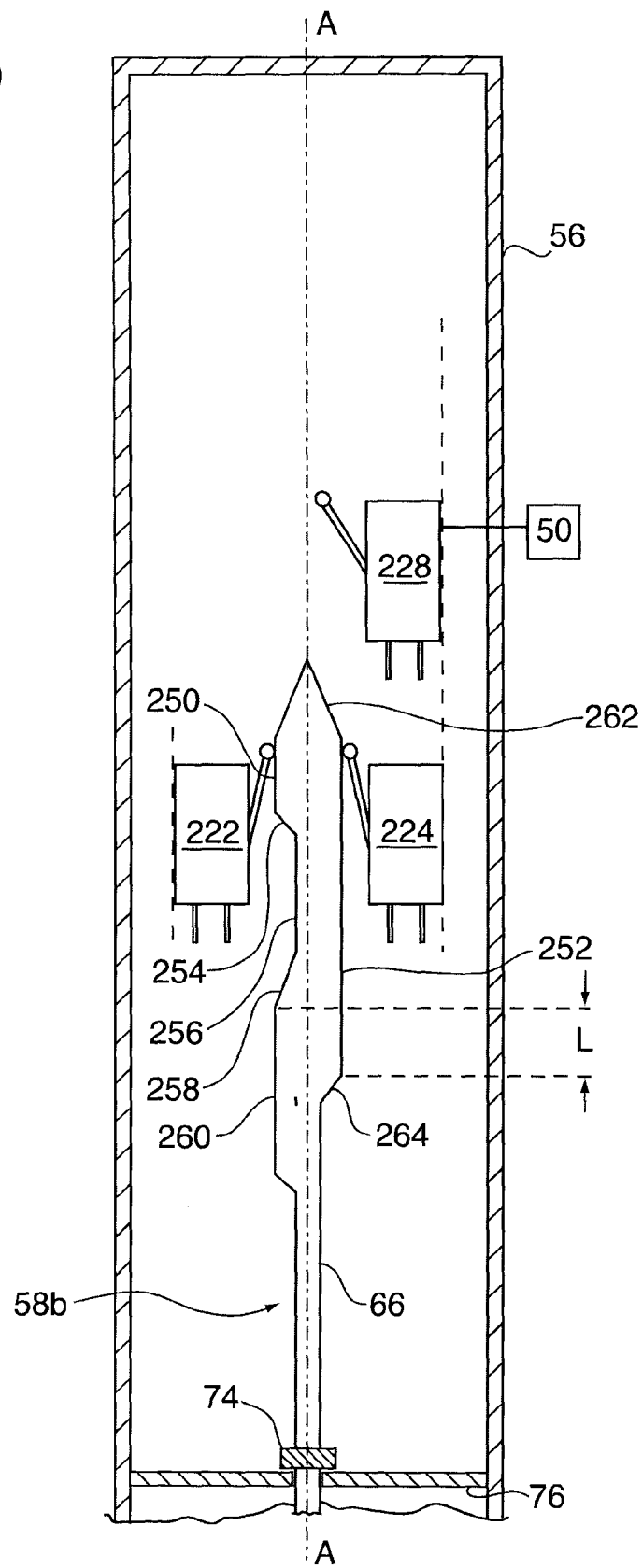
FIG. 9 is a longitudinal cross-section of an upper end of an alternate embodiment of an apparatus according to the invention; and, FIG. 10 is an electrical circuit diagram illustrating the electrical connection of the electrical components in a system incorporating the embodiment of the invention shown in FIG. 9.
Figure 10:
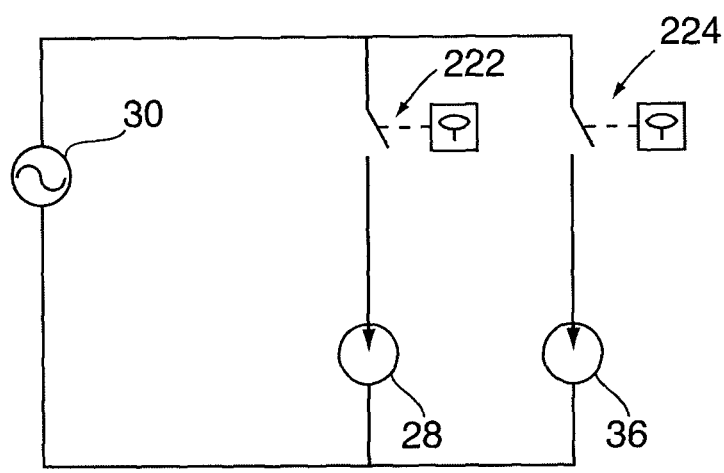

Referring to FIG. 9, in another embodiment, a cantilever-style float rod assembly 58b is shown in the resting position for use in activating three switches 222, 224 and 228. Switches 222 and 224 are wired "normally closed" and switch 228 "normally open". In the resting position, as shown, switches 222 and 224 are held by cam surfaces 250 and 252, respectively, in their engaged positions, so that both switches are held electrically "open". Referring to FIG. 10, switch 222 is wired in series between power source 30 and primary pump motor 28. Similarly, switch 224 is also wired in series between power source 30 and secondary pump motor 36. Switch 228 is in its normal disengaged position and thus, being "normally open", its associated electrical circuit 50, in this embodiment preferably an alarm circuit, is not energized.

In similar manner as previously disclosed above, when liquid enters the sump, float rod assembly 58b will rise and, as it does so, the actuator of switch 222 comes into contact with cam surface 254. Switch 222 is thereupon released to its normal position, namely electrically closed. Primary pump motor 28 is thereupon energized and begins to operate an associated primary pump (not shown in FIGS. 9 and 10). In normal operation, operation of the primary pump will subsequently lower the liquid level in the sump. In similar manner as previously described, the actuator of switch 222 will hold float rod assembly 58b at cam surface 254 in a latched upper position, until such time as the liquid level has been sufficiently lowered. However, if the primary pump fails to operate properly and fails to lower the level of liquid in the sump, float rod assembly 58b will continue to rise. The actuator of switch 222 follows along cam surface 256, allowing switch 222 to remain electrically closed, thus energizing or attempting to energize electric motor 28 and its associated primary pump in a continued attempt to lower the liquid level. However, if liquid level nevertheless continues to rise, upper cam surface 262 contacts the actuator of switch 228 and moves switch 228 to its engaged, electrically closed, position, thus energizing alarm circuit 50 and triggering an alarm condition. As liquid level continues to rise, a further cam surface 258 again moves switch 222 to its engaged, i.e. electrically open, position, thus actively preventing the further flow of current to primary pump motor 28 and turning it 'off'. During this operation, cam surface 252 has held switch 224 in its engaged, i.e. electrically open, position. As liquid level rises further, the actuator of switch 224 is allowed by cam surface 264 to be released to its normal, i.e. electrically closed, position, thus energizing secondary pump motor 36 and initiating operation of an associated secondary pump (not shown in FIGS. 9 and 10). In short, once the flow of current to primary pump motor 28 has been interrupted, power source 30 is used to energize pump motor 36. Preferably, there will be a short lag time between the deenergizing of motor 28 and the energizing of motor 36. In the illustrated embodiment, the lag time is established by the distance, L, between cam surfaces 256 and 264. In similar manner as previously described, the actuator of switch 224 will hold float rod assembly 58b at cam surface 264 in a latched upper position, until such time as the liquid level has been sufficiently lowered.

The active opening of switch 222 and the interruption of current flow to primary pump motor 28 as described above may have certain advantages in certain circumstances. For example, given that the primary pump has failed to lower liquid level, it may be reasonable to assume that there is some defect in either primary pump motor 28 or the associated primary pump; for electrical safety reasons, it could be preferable to deenergize same. As another example, power source 30 need only be sized to accommodate the operation of one pump motor at a time—either primary pump motor 28 or secondary pump motor 36, but not both. Typically, sump pump motors operate on a single 15 amp circuit. If both motors 28 and 36 were required to be operated simultaneously from the same circuit, the power capacity of such circuit would have to be increased, for example possibly to a 30 amp circuit. Alternatively, as previously disclosed above, a separate electrical circuit may be supplied for each motor, with attendant increased costs and use of electric panel capacity.

Although various preferred embodiments of the present invention have been described herein in detail, it will be appreciated by those skilled in the art that variations may be made thereto without departing from the spirit and scope of the invention.

The invention claimed is:

1. A method of operating a sump pump system having a power source, a primary electric motor connected to a primary pump operable to pump liquid from a vessel, a secondary electric motor connected to a secondary pump operable to pump liquid from the vessel a first switch operatively connected between the primary electric motor and the power source and a second switch operatively connected between the secondary electric motor and the power source, the method comprising the steps of:
  at a predetermined first liquid level in the vessel, closing the first switch to energize the primary pump motor,
  at a predetermined second liquid level in the vessel higher than the first liquid level, opening the first switch to de-energize the primary pump motor, and,
  at a predetermined third liquid level in the vessel higher than the second liquid level, closing the second switch to energize the secondary pump motor
wherein the said switches are incorporated into a system actuator having a float mechanism responsive to liquid level in the vessel and the method comprises the further step of controlling operation of said switches according to the position of the float mechanism, wherein the first and second switches are micro-switches having open and closed positions and the system actuator comprises a guide structure mounted in a fixed position relative to the vessel to which the first and second switches are mounted, a float rod slideably mounted to the guide structure allowing reciprocating movement in a generally vertical direction in an operating zone above a resting position, the float rod having upper and lower ends and upper and lower float stops and the float rod additionally having a first switch-closing cam surface cooperating with the first switch, a switch-opening cam surface cooperating with the first switch, and a second switch-closing cam surface cooperating with the second switch, and, a float slideably mounted to the float rod between the upper and lower float stops, which float floats with the level of liquid in the vessel, and wherein said controlling step comprises the steps of:
  moving the first switch from its open to its closed position by means of the first switch-closing cam surface during upward movement of the float rod;
  moving the first switch from its closed to its open position by means of the switch-opening cam surface during further upward movement of the float rod; and,
  moving the second switch from its open to its closed position by means of the second switch-closing cam surface during yet further upward movement of the float rod.

2. A method as claimed in claim 1 wherein the first and second switches are normally-closed and the first and second switch-closing cam surfaces are shaped to release the first and second switches to their normal positions at predetermined points during upward movement of the float rod and such that, under the influence of gravity, the weight of the float rod is insufficient to allow the float rod to move downwardly against resistance provided either by the first switch or separately by the second switch and the weight of the float rod combined with at least a portion of the weight of the float is sufficient to overcome either such resistance and to move the float rod downwardly and wherein said controlling step comprises the further steps of:
  supporting the float rod in a fixed position by the interaction of the second switch and the second switch-closing cam surface during downward movement of the float in an upper zone; and
  releasing the float rod to move downwardly when the weight of the float rod combined with at least a portion of the weight of the float exceeds a threshold and allowing the second switch-opening cam surface to operate in reverse to close the second switch.

3. A method as claimed in claim 2 wherein said controlling step comprises the further steps of:
  supporting the float rod in a fixed position by the interaction of the first switch and the first switch-closing cam surface during downward movement of the float in a lower predetermined zone; and
  releasing the float rod to move downwardly when the weight of the float rod combined with at least a portion of the weight of the float exceeds a threshold and allowing the first switch-opening cam surface to operate in reverse to close the first switch.

4. A method as claimed in claim 1 wherein the first switch is normally-closed and the first switch-closing cam surface is shaped to release the first switch to its normal position at a predetermined point during upward movement of the float rod and such that, under the influence of gravity, the weight of the float rod is insufficient to allow the float rod to move downwardly against resistance provided by the first switch and the weight of the float rod combined with at least a portion of the weight of the float is sufficient to overcome such resistance and to move the float rod downwardly and wherein said controlling step comprises the further steps of:
  supporting the float rod in a fixed position by the interaction of the first switch and the first switch-closing cam surface during downward movement of the float in a predetermined zone; and
  releasing the float rod to move downwardly when the weight of the float rod combined with at least a portion of the weight of the float exceeds a threshold and allowing the first switch-opening cam surface to operate in reverse to close the first switch.

5. A method of operating a sump pump system having a power source, a primary electric motor connected to a primary pump operable to pump liquid from a vessel, a secondary electric motor connected to a secondary pump operable to pump liquid from the vessel, a first switch operatively connected between the primary electric motor and the power source and a second switch operatively connected between the secondary electric motor and the power source, the method comprising the steps of:
  at a predetermined first liquid level in the vessel, closing the first switch to energize the primary pump motor,
  at a predetermined second liquid level in the vessel higher than the first liquid level, opening the first switch to de-energize the primary pump motor, and,
  at a predetermined third liquid level in the vessel higher than the second liquid level, closing the second switch to energize the secondary pump motor wherein the said switches are incorporated into a system actuator having a float mechanism responsive to liquid level in the vessel and the method comprises the further step of controlling operation of said switches according to the position of the float mechanism,
wherein the first and second switches are micro-switches having open and closed positions and the system actuator comprises a guide structure mounted in a fixed position relative to the vessel to which the first and second switches are mounted, a float rod slideably mounted to the guide structure allowing reciprocating movement in a generally vertical direction in an operating zone above a resting position, the float rod having upper and lower ends and upper and lower float stops and the float rod additionally having switch-closing cam surface structure for actuating the first and second switches and a switch-opening cam surface cooperating with the first switch, and, a float slideably mounted to the float rod between the upper and lower float stops, which float floats with the level of liquid in the vessel, and wherein said controlling step comprises the steps of:

moving the first switch from its open to its closed position by means of the switch-closing cam surface structure during upward movement of the float rod;

moving the first switch from its closed to its open position by means of the switch-opening cam surface during further upward movement of the float rod; and, moving the second switch from its open to its closed position by means of the switch-closing cam surface structure during yet further upward movement of the float rod.

6. A method as claimed in claim 5 wherein the switch-closing cam surface structure comprises a first switch-closing cam surface cooperating with the first switch and a second switch-closing cam surface cooperating with the second switch and wherein said step of moving the first switch from its open to its closed position comprises moving the first switch by means of the first switch-closing cam surface; and, said step of moving the second switch from its open to its closed position comprises moving the second switch by means of the second switch-closing cam surface.

7. A switching apparatus for controlling the operation of two electrical pump motors, in response to the level of a liquid in a vessel, the apparatus comprising:

a first switch adapted to be connected to control the operation of a first electrical pump motor;

a second switch adapted to be connected to control the operation of a second electrical pump motor;

a liquid level responsive apparatus operatively connected to the first and second switches to control the operation thereof whereby, at a first predetermined level the liquid level responsive apparatus will close the first switch, at a second predetermined level higher than the first level the liquid level responsive apparatus will open the first switch, and at a third predetermined level higher than the second level the liquid level responsive apparatus will close the second switch;

a guide structure adapted to be mounted in a fixed position relative to the vessel and wherein the switches are attached to the guide structure, wherein the liquid level responsive apparatus comprises a float mechanism attached to the guide structure and mechanically associated with the first and second switches, wherein the first and second switches are micro-switches having open and closed positions and the float mechanism comprises:

a float rod slideably mounted to the guide structure allowing reciprocating movement in a generally vertical direction in an operating zone above a resting position, the float rod having upper and lower ends and upper and lower float stops and the float rod additionally having a first switch-closing cam surface cooperating with the first switch to move the first switch from its open to its closed position during upward movement of the float rod, a switch-opening cam surface cooperating with the first switch to move the first switch from its closed to its open position during further upward movement of the float rod, and a second switch-closing cam surface cooperating with the second switch to move the second switch from its open to its closed position during yet further upward movement of the float rod, and, a float slideably mounted to the float rod between the upper and lower float stops, which float floats with the level of liquid in the vessel.

8. An apparatus as claimed in claim 7 wherein the first and second switches are normally-closed and the first and second switch-closing cam surfaces are shaped to release the first and second switches to their normal positions at predetermined points during upward movement of the float rod and such that, under the influence of gravity, the weight of the float rod is insufficient to allow the float rod to move downwardly against resistance provided either by the first switch or separately by the second switch and the weight of the float rod combined with at least a portion of the weight of the float is sufficient to overcome either such resistance and to move the float rod downwardly.

9. An apparatus as claimed in claim 7 wherein the first switch is normally-closed and the first switch-closing cam surface is shaped to release the first switch to its normal position at a predetermined point during upward movement of the float rod and such that, under the influence of gravity, the weight of the float rod is insufficient to allow the float rod to move downwardly against resistance provided by the first switch and the weight of the float rod combined with at least a portion of the weight of the float is sufficient to overcome such resistance and to move the float rod downwardly.

10. A switching apparatus for controlling the operation of two electrical pump motors, in response to the level of a liquid in a vessel, the apparatus comprising:

a first switch adapted to be connected to control the operation of a first electrical pump motor;

a second switch adapted to be connected to control the operation of a second electrical pump motor;

a liquid level responsive apparatus operatively connected to the first and second switches to control the operation thereof whereby at a first predetermined level the liquid level responsive apparatus will close the first switch, at a second predetermined level higher than the first level the liquid level responsive apparatus will open the first switch, and at a third predetermined level higher than the second level the liquid level responsive apparatus will close the second switch, a guide structure adapted to be mounted in a fixed position relative to the vessel and wherein the switches are attached to the guide structure, wherein the liquid level responsive apparatus comprises a float mechanism attached to the guide structure and mechanically associated with the first and second switches, wherein the first and second switches are micro-switches having open and closed positions and the float mechanism comprises:

a float rod slideably mounted to the guide structure allowing reciprocating movement in a generally vertical direction in an operating zone above a resting position, the float rod having upper and lower ends and upper and lower float stops and the float rod additionally having switch-closing cam surface structure cooperating with the first switch to move the first switch from its open to its closed position during upward movement of the float rod, a switch-opening cam surface cooperating with the first switch to move the first switch from its closed to its open position during further upward movement of the float rod, the switch-closing cam surface structure additionally cooperating with the second switch to move the second switch from its open to its closed position during yet further upward movement of the float rod, and, a float slideably mounted to the float rod between the upper and lower float stops, which float floats with the level of liquid in the vessel.

11. An apparatus as claimed in claim 10 wherein the switch-closing cam surface structure comprises a first switch-closing cam surface cooperating with the first switch and a second switch-closing cam surface cooperating with the second switch.

12. A pump systems for pumping liquid from a vessel and operating a secondary pump associated therewith comprising:
   a power source;
   a primary electric motor connected to a primary pump operable to pump liquid from the vessel;
   a secondary electric motor connected to a secondary pump operable to pump liquid from the vessel;
   a first switch operatively connected between the primary electric motor and the power source;
   a second switch operatively connected between the secondary electric motor and the power source;
   liquid level responsive apparatus operatively connected to the first and second switches to control the operation thereof whereby at a first predetermined level the liquid level responsive apparatus will close the first switch, at a second predetermined level higher than the first level the liquid level responsive apparatus will open the first switch, and at a third predetermined level higher than the second level the liquid level responsive apparatus will close the second switch;
   a guide structure mounted in a fixed position relative to the vessel and wherein the switches are attached to the guide structure,
wherein the liquid level responsive apparatus comprises a float mechanism attached to the guide structure and mechanically associated with the first and second switches,
wherein the first and second switches are micro-switches having open and closed positions and the float mechanism comprises:
   a float rod slideably mounted to the guide structure allowing reciprocating movement in a generally vertical direction in an operating zone above a resting position, the float rod having upper and lower ends and upper and lower float stops and the float rod additionally having a first switch-closing cam surface cooperating with the first switch to move the first switch from its open to its closed position during upward movement of the float rod, a switch-opening cam surface cooperating with the first switch to move the first switch from its closed to its open position during further upward movement of the float rod, and a second switch-closing cam surface cooperating with the second switch to move the second switch from its open to its closed position during yet further upward movement of the float rod, and,
   a float slideably mounted to the float rod between the upper and lower float stops, which float floats with the level of liquid in the vessel.

13. A system as claimed in claim 12 wherein the first and second switches are normally-closed and the first and second switch-closing cam surfaces are shaped to release the first and second switches to their normal positions at predetermined points during upward movement of the float rod and such that, under the influence, of gravity, the weight of the float rod is insufficient to allow the float rod to move downwardly against resistance provided either by the first switch or separately by the second switch and the weight of the float rod combined with at least a portion of the weight of the float is sufficient to overcome either such resistance and to move the float rod downwardly.

14. A system as claimed in claim 12 wherein the first switch is normally-closed and the first switch-closing cam surface is shaped to release the first switch to its normal position at a predetermined point during upward movement of the float rod and such that, under the influence of gravity, the weight of the float rod is insufficient to allow the float rod to move downwardly against resistance provided by the first switch and the weight of the float rod combined with at least a portion of the weight of the float is sufficient to overcome such resistance and to move the float rod downwardly.

15. A pump system for pumping liquid from a vessel and operating a secondary pump associated therewith comprising:
   a power source;
   a primary electric motor connected to a primary pump operable to pump liquid from the vessel;
   a secondary electric motor connected to a secondary pump operable to pump liquid from the vessel;
   a first switch operatively connected between the primary electric motor and the power source;
   a second switch operatively connected between the secondary electric motor and the power source;
   a liquid level responsive apparatus operatively connected to the first and second switches to control the operation thereof whereby at a first predetermined level the liquid level responsive apparatus will close the first switch, at a second predetermined level higher than the first level the liquid level responsive apparatus will open the first switch, and at a third predetermined level higher than the second level the liquid level responsive apparatus will close the second switch;
   a wide structure mounted in a fixed position relative to the vessel and wherein the switches are attached to the guide structure,
wherein the liquid level responsive apparatus comprises a float mechanism attached to the guide structure and mechanically associated with the first and second switches,
wherein the first and second switches are micro-switches having open and closed positions and the float mechanism comprises:
   a float rod slideably mounted to the guide structure allowing reciprocating movement in a generally vertical direction in an operating zone above a resting position, the float rod having upper and lower ends and upper and lower float stops and the float rod additionally having switch-closing cam surface structure cooperating with the first switch to move the first switch from its open to its closed position during upward movement of the float rod, a switch-opening cam surface cooperating with the first switch to move the first switch from its closed to its open position during further upward movement of the float rod, the switch-closing cam surface structure additionally cooperating with the second switch to move the second switch from its open to its closed position during yet further upward movement of the float rod, and,
   a float slideably mounted to the float rod between the upper and lower float stops, which float floats with the level of liquid in the vessel.

16. A system as claimed in claim 15 wherein the switch-closing cam surface structure comprises a first switch-closing cam surface cooperating with the first switch and a second switch-closing cam surface cooperating with the second switch.

* * * * *